June 2, 1931.  F. G. L. BOYER  1,807,825
CONTROLLING DEVICE
Filed May 26, 1926
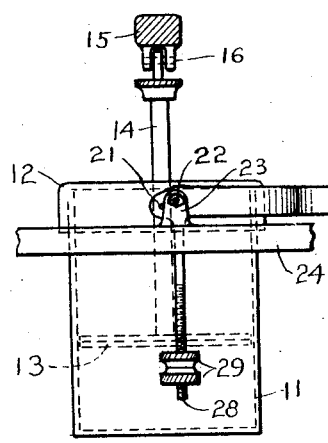
Fig. 1.
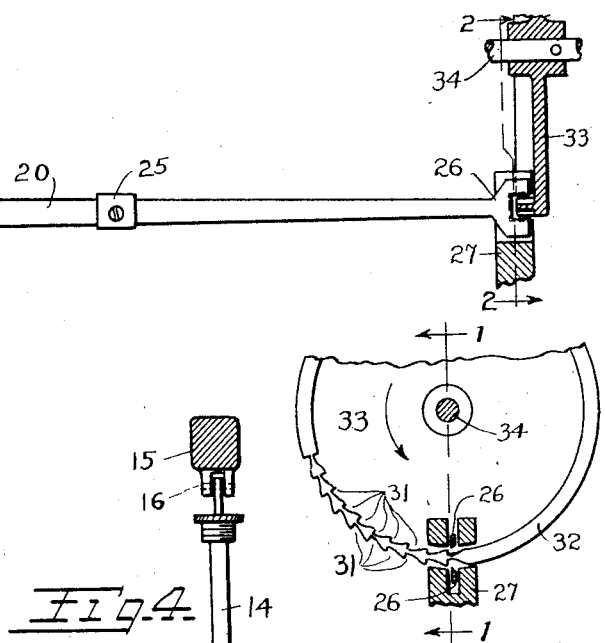
Fig. 2.
Fig. 4.
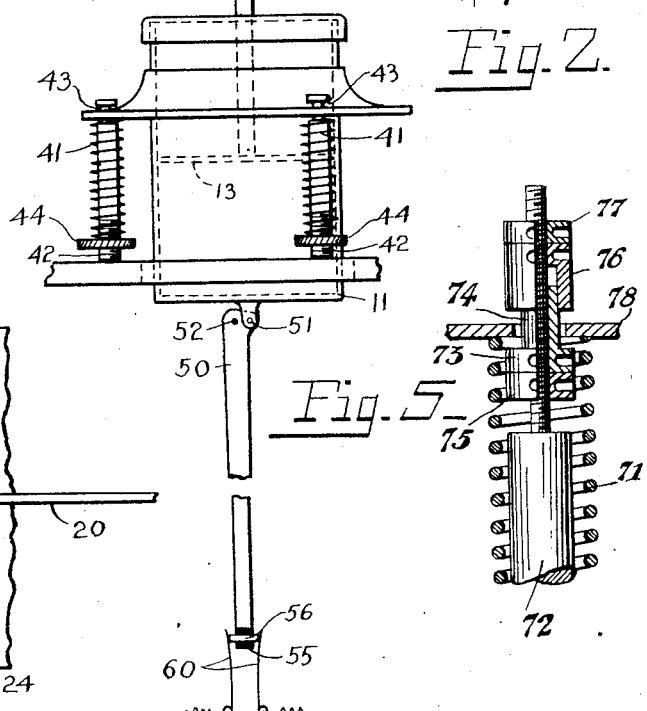
Fig. 3.
Fig. 5.
INVENTOR.
Frederick G. L. Boyer Patented June 2, 1931

1,807,825

UNITED STATES PATENT OFFICE

FREDERICK G. L. BOYER, OF DAYTON, OHIO

CONTROLLING DEVICE

Application filed May 26, 1926. Serial No. 111,868.

My invention relates to improvements in controlling devices, more particularly to devices for preventing operation of any type of mechanism connected to an automatic scale until the scale is in a position of equilibrium, and to any other devices in which a similar type of control may be needed. More specifically my device is an improvement on the devices shown and described in my prior Patent 1,449,162, Scale and auxiliary controller, March 20, 1923, and in my co-pending application Serial No. 544,126, Electrical controlling device, filed March 16, 1922.

In the above mentioned prior inventions I have secured the desired control from the dash pot ordinarily attached to automatic scales to check the freedom of their oscillations and bring them quickly to a position of equilibrium. In order to cause such a dash pot to lock mechanism connected to the scale until the scale comes to a position of equilibrium and the dash pot piston, which is attached to a moving part of the scale, comes to rest, I have provided, in the prior inventions mentioned, a secondary cylinder connected to the dash pot cylinder by two ports, one above and one below the piston. This secondary cylinder acts like a pressure gage and its piston, and a lever attached thereto, are displaced from normal position during movement of the primary dash pot piston, due to the fact that movement of the primary piston causes a difference of pressure above and below it which is manifested by the tendency for the fluid to flow away from the side toward which the piston is moving. This lever, attached to the secondary piston, which is thus in its normal position only while the scale mechanism is at rest, i. e. in a position of equilibrium, is so arranged as to lock the attached mechanism when it is out of its normal position due to movement of the primary piston and the scale to which it is attached, and with which it moves.

Although these devices function perfectly the manufacture of a dash pot with two cylinders connected by ports so constructed as to be free from danger of leakage when subjected to the strains which sometimes occur due to shipping and handling such devices, and be free from other defects and objectionable features, is a somewhat difficult and expensive process. It is also found that the fact that the ports must be relatively large and must be located well above and below the extremities of movement of the piston makes it necessary to construct a dash pot considerably longer than would otherwise be necessary or desirable.

The prime object of the present invention is therefore the simplification of the structure, and reduction of the difficulty and cost of manufacture, by eliminating the necessity for the addition of a secondary cylinder to the usual form of dash pot, without losing any of the advantages of the earlier structures.

Reference to the above mentioned patent and co-pending application will show that they are designed so that a movement of the scale somewhat less than the degree of motion necessary to effect a change in the reading, in the smallest units adapted to be determined by the particular scale, is sufficient to cause an effective displacement of the locking member at the end of the lever attached to the secondary piston. A smaller degree of movement of the scale is of no consequence and may therefore be considered equilibrium. Thus the terms motion and equilibrium of the scale as used throughout these specifications and claims are to be understood as meaning the degree of movement above described, or the lack of that degree of movement. In scales as they are usually built this degree of movement of the scale corresponds to an extremely small movement of the dash pot piston. In my prior inventions this extremely small movement of the dash pot piston is twice magnified in being communicated to the locking member on the end of the lever attached to the secondary piston. The locking member is thus given a movement very much greater than the movement of the dash pot piston.

In the present invention I provide means for obtaining the same ratio of increase between the amount of movement of the dash pot piston and the locking member as has just been shown to be necessary, but without the addition of a secondary cylinder to the dash pot. I do this by providing an ordinary single cylinder dash pot having the piston attached to a moving part of the scale just as in the previous inventions, and in scales as now made for the market. I further provide a yielding mounting or support for the dash pot cylinder, so arranged that while the piston is at rest the cylinder will be in what I shall call its normal position, and whenever the piston is moving in either direction the cylinder will be displaced in the direction of movement of the piston, and will remain so displaced as long as the piston continues to move.

The term normal position as used in these specifications and claims in referring to the locking member means a position thereof which permits operation of the mechanism which it is designed to lock; and the term displacement of the locking member should be understood to mean effective displacement, i. e. a displacement sufficient to remove it from what I have called its normal position and thus cause it to lock the mechanism against operation. The same terms used in referring to the dash pot cylinder and parts connecting the cylinder with the locking member should be understood to define the position of these parts necessary to hold the locking member in the position defined by the term.

The total amount of displacement, in either direction, which is allowed to the cylinder is very slight, and the mounting is so constructed that an extremely small movement of the piston will cause a displacement of the cylinder almost as great as the movement of the piston. It is then simply necessary to provide suitable mechanism for multiplying this displacement of the cylinder by the amount necessary to give an effective degree of movement of the locking member when the movement of the scale becomes almost sufficient to effect a change in the reading in the smallest units determinable by the particular scale used. Although this may be done in various ways I prefer, for the sake of simplicity, to do it by means of a single simple lever attached either to the dash pot cylinder itself, or to the yielding mounting.

The amount of multiplication necessary depends upon several factors which are dependent upon the particular mechanism to which my device is applied. The first of these is the amount of movement of the piston which is required to cause locking of the connected mechanism. The second of these is the amount of movement required of the particular locking mechanism used, which in turn depends largely on the strength of lock required. The third of these is the leakage around the piston, which in turn depends on the clearance around the piston, and any openings therein, and on the viscosity of the fluid used. There may also, in certain cases, be other factors which may have to be considered in determining the amount of multiplication necessary.

From the foregoing it will be apparent that the present invention is equally applicable whether it is desired to provide a simple mechanical lock, such as described in my Patent No. 1,449,162, or to provide means for causing an electrically operated device to automatically begin its operation when the scale to which it is attached comes to rest in its position of equilibrium, or to prevent the starting of such an electrically operated device until the scale is in equilibrium, as described in my co-pending application Serial No. 544,126.

The construction and arrangement of the mechanism by which I accomplish the above described results will be more clearly understood by reference to the accompanying drawings in which:

Fig. 1 is an elevation of my device showing connections to an automatic scale, and to a recording or other mechanism connected thereto, like those shown in my prior patent No. 1,449,162.

Fig. 2 is a section taken on line 2—2 of Fig. 1, showing the locking device in detail.

Fig. 3 is a plan view of the dash pot shown in Fig. 1, together with its mountings.

Fig. 4 is an elevational view of a dash pot with a modified form of mounting, and arranged to give an electrical control of the devices connected to the scale, as shown in my co-pending application Serial No. 544,126.

Fig. 5 is an enlarged detailed view, in quarter section, of the upper end of one of a modified form of the guide pins shown in Fig. 4.

Referring first to Fig. 1 the dash pot cylinder 11, covered by a suitable cap 12, has a piston 13. connected to a rod 14, which moves therein. This piston rod 14 is connected to a moving part 15 of the scale mechanism by means of a pin 16, or other suitable connection. This part 15 may be any suitable part of the scale mechanism, and it will be understood to be at rest while the scale is in equilibrium, and moving while the scale mechanism is coming to its position of equilibrium. This dash pot, instead of being secured directly to the frame of the machine in the usual manner, is pivotally connected to a lever 20 by pins 21 which may be round as shown, in the form of knife edges, or in any other suitable form. The lever 20 carries pivots 22, which, in order to secure the utmost freedom of movement of the lever 20, I prefer to make in the form of knife edges as shown in the figure. These knife edge pivots 22 rest in the V bearings 23 which are formed on a part 24 of the frame of the machine. The lever 20 also carries an adjustable counterweight 25 which is used to secure the proper balance. At its end the lever 20 is made in the form of a fork 26 which co-operates with notches 31 which are provided in the rim 32 which is formed on a disc 33 mounted on one of the shafts 34 of the recording or other mechanism connected to the scale, to form the locking mechanism which is in this case the same as that shown and described in my Patent No. 1,449,162. This locking mechanism is fully described in that patent and here it need only be noted that displacement of lever 20 in either direction will cause one side of the fork 26 to enter either the interior or exterior of the notches 31; and that if the direction of the displacement of the lever 20 is reversed due to a reversal of the direction of movement of the scale it may be possible to get one or two of the notches 31 past the fork 26 on lever 20, but the rotation of shaft 34 and operation of the recording mechanism will not be permitted because one side of the fork 26 will enter the second or third notch if the first one happens to get past. This means that it will not be possible to operate the recording mechanism until the scale comes to rest in a position of equilibrium under a particular applied load, the mere momentary cessation of movement due to a change in direction being insufficient to permit operation, the entire state of rest necessary to permit operation being only attained when the scale is actually in equilibrium.

The lever 20 is so constructed and the counterweight 25 is so adjusted that the weight of the dash pot is exactly counterbalanced. In order that, when the motion of piston 13 ceases, the lever 20 and connected parts shall automatically return to their normal position (shown in Figs. 1 and 2), in which rotation of disc 33 and consequently operation of the recording mechanism is permitted, I provide that lever 20 shall be in equilibrium in this position when piston 13 is at rest. To do this it is simply necessary that the center of gravity of the combination shall be below the pivots 22. This is taken care of by the shape of lever 20 and the location of pivots 21 and 22 therein, and by the adjustment of counterweight 25.

The amount of movement of piston 13 which is necessary to displace lever 20 from its normal position an amount sufficient to lock disc 33 against movement, and the rapidity with which it will return to its normal position after the movement of piston 13 ceases, depends upon the weight of lever 20, together with the total loads which it carries, and the distance of the center of gravity below the pivots 22. In order that this may be adjusted to the exact degree required in any case I provide a depending arm 28 on one or both sides of lever 20. This arm 28 is threaded to carry adjustable counterweights 29 which can be screwed up or down to make the device as sensitive as desired. If the counterweights 29 do not give sufficient adjustment more can be obtained by the substitution of lighter or heavier weights.

In order that a very small movement of the piston 13 shall be sufficient to cause fork 26 to move far enough to lock disc 33 against rotation I provide that the end of lever 20 on which it is mounted shall be much longer than the end on which the dash pot cylinder 11 is mounted. The ratio between the two arms of this lever depends on several factors which are controlled by the design of the devices on which my invention is being used, as I have already described. It should be noted, however, that the multiplication need not be as great as that provided by the two methods in my Patent No. 1,449,162, because in that case there is not only loss due to the leakage around the primary piston, but also due to leakage around the secondary piston, and to frictional resistance in the secondary cylinder and piston. That is in the present case there is only one of these sources of loss to be considered, whereas in the unimproved device shown in my previous patent, there are several sources of loss to be considered. As before stated this multiplication is made sufficient that, allowing for all losses due to leakage, etc., any movement of the piston 13 great enough to effect a change in the reading in the smallest units adapted to be determined by the scale to which it is attached, will be ample to cause locking of the disc 33. In other words, whenever the scale is moving the disc 33 and connected mechanism will be locked against operation, and whenever the scale comes to rest in a position of equilibrium the disc 33 and connected mechanism will be free to rotate.

It should be noted that in order to avoid the necessity of an excessive multiplication in lever 20, it is highly desirable to reduce the loss of movement between the piston 13 and the cylinder 11 to the smallest feasible amount. In other words, in order that the very small movement of piston 13, which in some applications must cause the disc 33 to be locked against rotation, shall be able to accomplish this result without an objectionably great multiplication by the lever 20, I have provided means whereby a very small movement of the piston 13 may be made, in cases where it is required, to cause a displacement of the cylinder 11, almost as great as the movement of the piston. The means I have provided for this purpose is the delicate balancing of the lever 20 carrying the dash pot. This is accomplished, in the embodiment of my invention here illustrated, by the form and arrangement of the lever 20 and by the adjustable counterweights 29 whereby it is possible to bring the center of gravity of the lever 20, together with all parts supported thereby, to as small a distance below the supporting pivot 22, as may be required in any particular application.

Fig. 4 shows a different arrangement of my invention. In place of the balanced lever supporting the dash pot I provide that springs 41 surrounding guide pins 42 support it in equilibrium. These springs are made quite soft so that a slight depressing or lifting force exerted by a slight movement of piston 13 will displace the cylinder of the dash pot just as in the previous case. The amount of displacement is limited by the length of the section 43 of reduced diameter on guide pins 42, which, for the sake of clearness in the drawing, is shown much longer than necessary. If desired this portion may be threaded and adjusting nuts used to fix the limits of displacement of the cylinder 11, as illustrated in Fig. 5, where the guide pins 42 have been replaced by pins 72 which are so threaded, and which are surrounded by springs 71 in place of springs 41. A portion of the flange attached to the dash pot cylinder 11 is shown in section at 78. The downward displacement of this flange 78 and cylinder 11 is limited by the adjustable nut 73 held in place by lock nut 75, and their upward displacement is limited by the adjustable nut 76 held in place by lock nut 77. In order to prevent the threads on pin 72 from interfering with the free movement of flange 78 a smooth projecting portion 74 may be provided on nut 73. This and a corresponding counterbore in nut 76 may be made long enough to take care of any adjustment which may be desired. There are also other well known means of adjustment which may be provided if desired. The tension on the springs can be regulated by the adjusting nuts 44, and the normal position of the dash pot and locking lever thereby corrected.

A lever 50 similar to the lever 20 is shown in this case, except that it need not be balanced because the counterbalance is here furnished by the springs 41 as already described. The lever 50 is shown connected to the dash pot by a pivot 51, and mounted to rock on a fixed pivot 52. It is also shown with its long arm vertical, although it could equally well be horizontal if desired. In place of the mechanical locking means at the end of the lever as shown in Figs. 1 and 2, I show in this case a conductor 56 mounted in a block of insulation 55 on the end of the lever 50. This conductor is adapted to make an electrical contact between contacts 60 when the scale is at rest in equilibrium, and to break such contact whenever the scale is moving in either direction, thus controlling the operation of a recording or other device just as is fully shown and described in my co-pending application No. 544,126.

It should be understood that mechanical locking devices such as shown in Fig. 1 could be used here in place of the electrical contacts shown, and that these electrical contacts could be used in place of the mechanical lock shown in Fig. 1, if desired.

I do not wish to be understood as limiting my invention to the particular forms or adaptations described herein, or in the prior patent and application referred to, as my present invention is as broadly useful and even more adaptable to application to various devices under varying conditions than my above mentioned previous inventions. All of the changes and adaptations suggested and many other could be made by those skilled in the art within the scope of the present invention and the appended claims.

I claim:

1. In combination: an element having a to and fro movement; a second element; and means for preventing operation of the second element while the first element is moving, comprising a fluid dash pot the piston of which is connected to said first element, a yielding support for said dash pot, a mechanical connection between said dash pot and said second element, so arranged that movement of the first element causes said mechanical connection to prevent operation of the second element.

2. In combination: a mechanical element; a fluid dash pot the piston of which is connected to said element; a yielding support for said dash pot such that when said element is moving in either direction said support will yield and allow a slight displacement of the cylinder of said dash pot in the same direction; and means of adjustment for varying the degree of movement of said element required to cause a certain displacement of the cylinder.

3. In combination: two mechanical elements; a fluid dash pot the piston of which is connected to the first element; a yielding support for said dash pot such that when said first element is moving in either direction said support will yield and allow a slight displacement of the cylinder of said dash pot in the same direction; means whereby said displacement of the dash pot cylinder prevents operation of the second element; and adjusting means for varying the degree of movement of said first element required to cause a displacement of said cylinder sufficient to prevent operation of said second element.

4. In combination: two elements; a fluid dash pot the piston of which is connected to the first element; a yielding support for said dash pot such that when said first element is moving in either direction said support will yield and allow a slight displacement of the cylinder of said dash pot in the same direction; a mechanical connection between said dash pot and the second element; and means whereby said displacement of the dash pot cylinder causes said mechanical connection to prevent operation of the second element so long as said displacement continues.

5. A fluid dash pot; a yielding support therefor; means whereby movement of the piston of said dash pot in either direction will cause a slight displacement of said dash pot from its normal position; and means for varying the degree of movement of the piston required to cause a certain displacement.

6. A fluid dash pot; a yielding support for the cylinder thereof; means for reducing, to any desired extent, the resistance which said support will offer to displacement of said cylinder so that a very small movement of the piston may be made to cause a movement of the cylinder, almost as great as that of the piston.

7. A fluid dash pot; a yielding support for the cylinder thereof; a structure for said support whereby it may be rendered so sensitive that a very small movement of the piston may be made to cause a movement of the cylinder, almost as great as that of the piston, said structure being adjustable for varying the degree of movement of the piston required to cause a certain movement of the cylinder.

8. In an automatic scale; a single cylinder fluid dash pot for checking the oscillations of said scale; means for holding the cylinder of said dash pot in a certain position while the scale is in equilibrium, and for holdng it out of that position while the scale is moving; and adjusting means for varying the degree of movement of the scale which is sufficient to remove said cylinder from said position.

9. In an automatic scale; a fluid dash pot, comprising a piston adapted to operate in a cylinder which is fluid tight on bottom and sides, for checking the oscillations of said scale; mechanism operated by power derived from a source other than the scale; a lock adapted to prevent operation of said mechanism; and means whereby said dash pot causes said lock to prevent the operation of the said mechanism whenever the scale is moving.

10. In an automatic scale; a fluid dash pot, comprising a piston adapted to operate in a cylinder which is fluid tight below every operating position of the piston, for checking the oscillations of said scale; mechanism operated by power derived from a source other than the scale; a mechanical connection between the dash pot and said mechanism whereby the operation of said mechanism is prevented whenever the scale is moving.

11. A fluid dash pot; and a balanced lever normally supporting said dash pot in a certain position, so that movement of the piston will displace said dash pot and lever from said position, and a cessation of said movement will cause them to return to said position.

12. A fluid dash pot; a balanced lever normally supporting said dash pot in a certain position; and means whereby, when the piston of said dash pot is moving in either direction, the dash pot and lever are held out of their normal position.

13. A fluid dash pot; and means whereby movement of the piston in either direction will displace the cylinder in the same direction, against the action of gravity.

14. A fluid dash pot; means whereby movement of the piston in either direction will displace the cylinder in the same direction against the action of gravity; and means whereby, when movement of the piston ceases, the cylinder is returned to its original position by the action of gravity.

15. A fluid dash pot; mechanism controlled thereby; a yielding support for the cylinder of said dash pot; a lock for said mechanism; a structure for said support whereby it may be rendered so sensitive that a very small movement of the piston may be made to cause a displacement of the cylinder, almost as great as the movement of the piston; and means whereby such displacement of the cylinder operates said lock to prevent the operation of said mechanism.

16. A fluid dash pot; mechanism controlled thereby; a yielding support for the cylinder of said dash pot; a lock for said mechanism; a structure for said support whereby it may be rendered so sensitive that a very small movement of the piston may be made to cause a displacement of the cylinder, almost as great as the movement of the piston; and means for causing said lock to prevent operation of said mechanism while said displacement continues.

17. A fluid dash pot comprising a cylinder, fluid tight on bottom and sides, and a piston adapted to operate therein; a mechanical element; a lock for locking said element against operation; and means, controlled by hydrostatic pressure within said dash pot, for maintaining said lock in locking position while the piston of said dash pot is in motion.

18. A single cylinder fluid dash pot; a mechanical element; a lock for locking said element against operation; means, controlled by hydrostatic pressure within said dash pot, for maintaining said lock in locking position while the piston of said dash pot is in motion, and for maintaining said lock out of locking position while the piston of said dash pot is not in motion.

FREDERICK G. L. BOYER.